Figure 8:
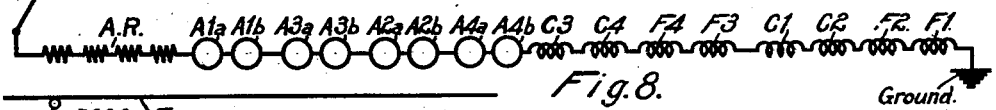
Figure 9:
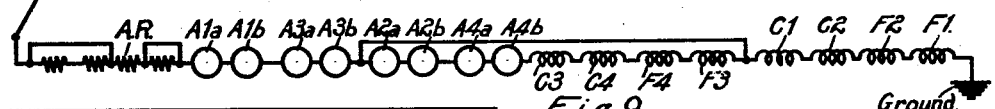
Figure 10:
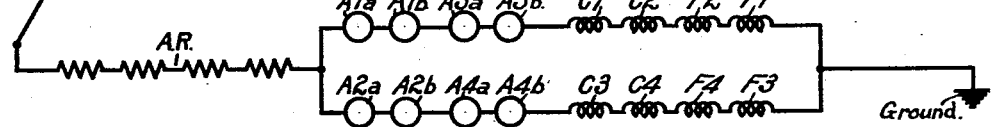

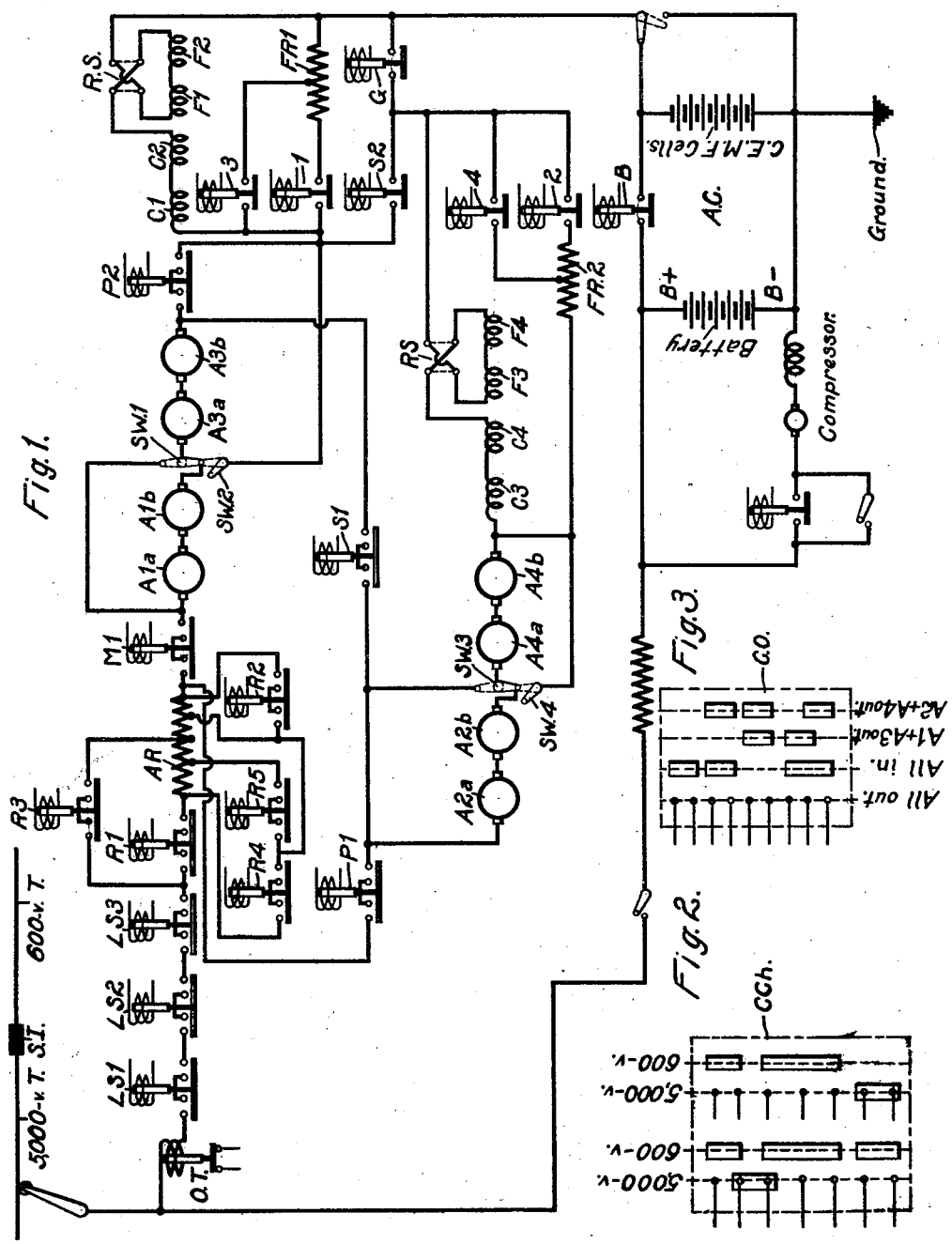

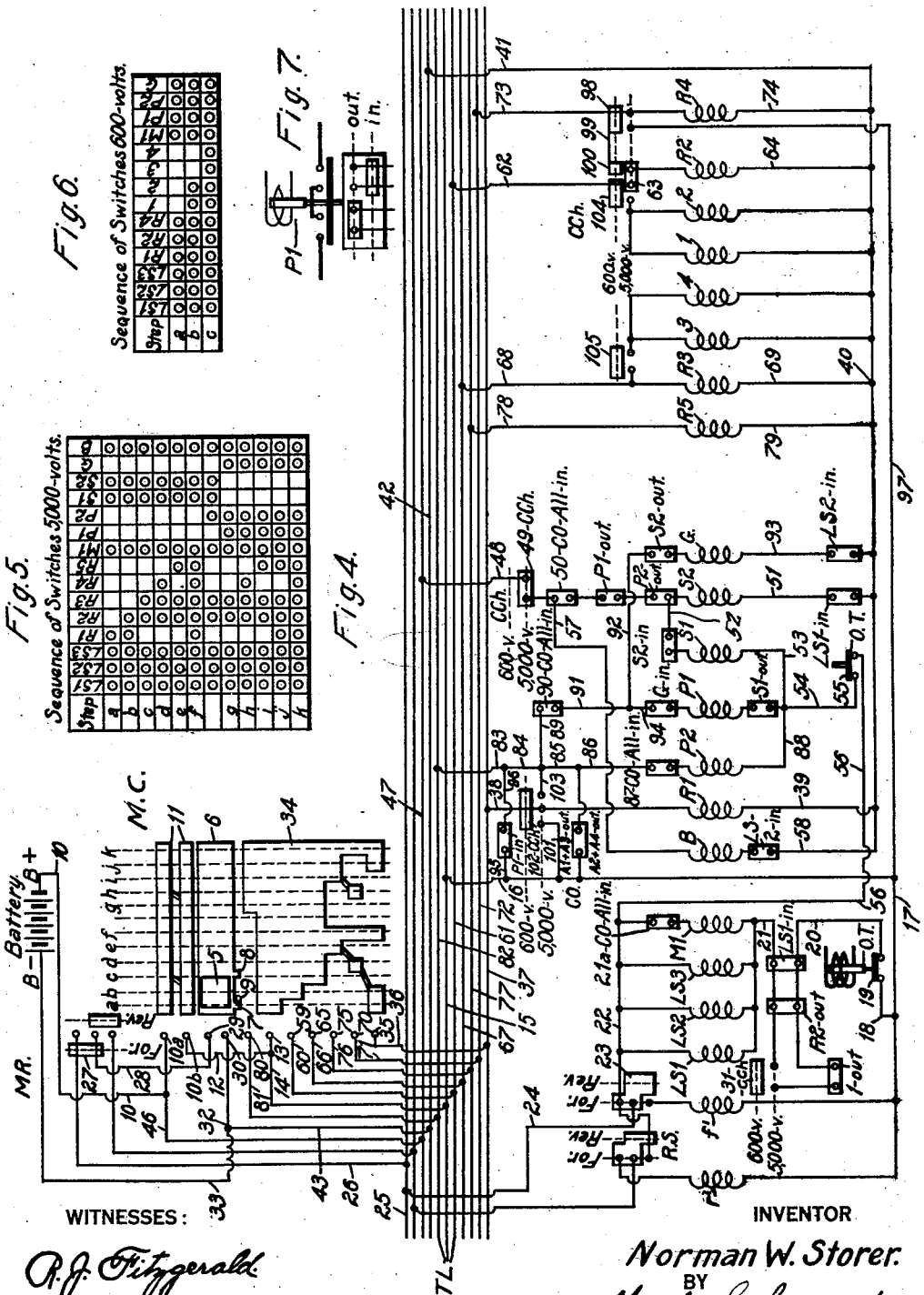

N. W. STORER.
CONTROL SYSTEM.
APPLICATION FILED SEPT. 5, 1916.

1,323,332.

Patented Dec. 2, 1919.
3 SHEETS—SHEET 3.

WITNESSES:
R. J. Fitzgerald
W. B. Wells

INVENTOR
Norman W. Storer.
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,323,332.      Specification of Letters Patent.      Patented Dec. 2, 1919.

Application filed September 5, 1916. Serial No. 118,391.

*To all whom it may concern:*

Be it known that I, NORMAN W. STORER, a citizen of the United States, and a resident of Pittsburgh, in the county of Allegheny and State of Pennsylvania, have invented a new and useful Improvement in Control Systems, of which the following is a specification.

My invention relates to systems of control and particularly to the control of electric railway motors that are adapted for operation from supply circuits of materially different voltages.

One object of my invention is to provide a system of the above indicated character which shall effectively and reliably permit the use of a plurality of direct-current motors in connection with a supply circuit of relatively high voltage, such as 5000 volts, which may be employed during the interurban portion of the run, and in connection with a relatively low voltage, such as 600 volts, which must be used when the vehicle is operating in cities and towns, and to employ a relatively small number of switches.

Another object of my invention is to provide a system of the above indicated character that shall be provided with motors which may be connected in series and in series-parallel-circuit relation across the high-voltage supply circuit and which may be connected across the low-voltage supply circuit with the armatures disposed in parallel-circuit and the field windings disposed in series-circuit relation.

Another object of my invention is to provide a system of the above indicated character that shall be provided with means whereby the motors contained therein may be accelerated in a number of resistance steps when connected across the high-voltage supply circuit and which may be accelerated by the so-called field control when connected across the low-voltage supply circuit.

In the accompanying drawings, Figure 1 is a diagrammatic view of the main circuits of a system of control embodying my invention; Fig. 2 and Fig. 3 are diagrammatic views of certain pieces of control apparatus that are employed in connection with the auxiliary governing system which is illustrated in Fig. 4 and which is adapted to govern the various motor-controlling switches that are shown in Fig. 1 in accordance with the one or the other of the sequence charts that are illustrated in Fig. 5 and Fig. 6, according to the service conditions; Fig. 7 is a detail, diagrammatic view of a complete motor-controlling switch, and Figs. 8 to 13, inclusive, are diagrammatic views of the circuit formed through the motors when the same are connected across the supply circuits.

Referring to Fig. 1, the system shown comprises a plurality of supply circuits of materially different voltages having positive supply-circuit conductors marked "5000 v. T." and "600 v. T.", standing for 5000-volt trolley and 600-volt trolley, respectively, which may be separated from each other in any suitable manner, as by a section insulator SI; a common negative return conductor marked "Ground"; a plurality of electric motors of the twin-armature type respectively comprising pairs of armatures A1a and A1b, A2a and A2b, A3a and A3b, and A4a, and A4b, commutating field-magnet windings C1, C2, C3 and C4 and main field windings F1, F2, F3, and F4; a reversing switch RS, preferably of a familiar electrically-controlled type, for reversing the electrical relations of the pairs of main field windings F1 and F2, and F3 and F4 with respect to the corresponding armatures and commutating field windings; an accelerating resistor AR with which is suitably associated a plurality of resistor short-circuiting switches R1 to R5, inclusive; a plurality of motor-controlling switches LS1, LS2, LS3, M1, P1, P2, S1, S2, and G; a plurality of field-regulating resistors FR1 and FR2 for the respective pairs of motors, and a plurality of switches 1 and 3, which are associated with the resistor FR1, and 2 and 4 which are connected to the resistor FR2, for varying the excitation of the corresponding field windings during 600-volt operation of the motors, as more fully set forth later; a plurality of motor change-over switches SW1 to SW4, inclusive; an overload trip OT of a suitable high-voltage type for effecting an opening of the motor circuit under overload conditions; and a set of auxiliary circuits AC that are interposed between the motors and the negative supply-circuit conductor Ground.

The motor change-over switches SW1 to SW4 are adapted to occupy the solid-line position for 5000-volt operation, and the dotted-line position for 600-volt operation, whereby the adjacent sets of twin armatures are disposed in series and in parallel relation, respectively. The preferred switch construction is fully set forth in a co-pending application of F. G. Hickling, Serial No. 65,776, filed December 8, 1915.

The auxiliary circuits AC are shown as comprising, in general, a storage battery, marked "Battery," which is adapted to be connected in parallel-circuit relation, upon the closure of a switch B, to a set of regulating counter-electromotive force cells marked "C. E. M. F. Cells," whereby the battery, which may be employed for energizing the actuating coils of the various switches or for any other purpose, is connected in series relation with the main-motor circuit and is adapted to be properly charged; and a motor for driving a compressor which may be employed for furnishing air to the braking system or for any other purpose, as will be understood. The auxiliary system just described forms no material part of my present invention, and is fully shown and described in my co-pending application, Serial No. 781,742, filed July 29, 1913, patented July 3, 1917, No. 1,231,662, and assigned to the Westinghouse Electric and Manufacturing Company.

It should be observed that the switches S2, G, B and 1 to 4, inclusive, are shown as being of a single-break type and are adapted to withstand only low-voltage operation, that is to say, they are not constructed to permit of the impression of a relatively high voltage upon their terminals during either the closing or the opening of their circuits; while the remaining motor-controlling switches are illustrated as being of the double-break type and are thus adapted to withstand high-voltage operation. Consequently, it is necessary to provide means for preventing the impression of a dangerously high voltage upon any of the low-voltage switches, even though a low-voltage switch is connected in series relation with a number of the high-voltage switches during a certain portion of the accelerating period. Such preventive means will be fully described in connection with the auxiliary governing system of Fig. 4.

Reference may now be had to Fig. 4 which illustrates, in addition to the actuating coils of the various motor-controlling switches and the "battery" for energizing the coils, a plurality of electrical interlocks that are associated with, and adapted to be actuated by, the various switches in accordance with the familiar construction that is illustrated in Fig. 7; a plurality of other contact members that are associated with either the control change-over switch CC*h* that is illustrated in Fig. 2 or with the control cutout switch CO that is shown in Fig. 3; a master controller MC that is adapted to occupy a plurality of positions *a* to *k*, inclusive; a master reverser MR of a well known type; actuating coils *f'* and *r'*, corresponding to forward and reverse operation of the main-circuit reversing switch RS; and a plurality of train-line conductors TL for adapting the system for multiple-unit control, in accordance with familiar practice.

The control change-over switch CC*h* that is shown in Fig. 2 is adapted to occupy two positions, respectively marked "5000—v." and "600—v." for manipulating certain of the control circuits of Fig. 2 in accordance with the supply circuit that is employed at the time.

The control-circuit cutout switch CO that is illustrated in Fig. 3 is adapted to occupy four positions respectively marked "All out," "All in," "A1 and A3 out," and "A2 and A4 out," for suitably arranging the auxiliary governing circuits when certain of the motors are excluded from circuit by reason of damage thereto, as will be understood.

The master controller MC is provided with a structure of the slip-segment type, for a purpose to be hereinafter set forth, which comprises a suitable annular band 6 of insulating material that makes frictional engagement with the body of the master controller and upon which is disposed a contact member 5 that has a width corresponding to two notches of the controller. The annular band 6 is here shown as provided with a plurality of lugs or projections 7 and 8 that are disposed a distance apart which also corresponds to two notches, and a stationary pin or arm 9 is suitably associated with the frame (not shown) of the controller. The slip-segment in question forms no part of my present invention except as it performs a certain function in connection therewith. The preferred structure is fully shown and described in my co-pending application Serial No. 774,394, filed June 18, 1913, patented Nov. 9, 1917, No. 1,239,840.

The mechanical operation of the slip-segment may be briefly set forth as follows: When the master controller is actuated from its off position through its initial operative position, the annular band 6 moves with the controller until the projection 8 strikes the pin 9, and the contact member 5 engages certain control fingers to complete the circuits of the actuating coils of certain switches, as hereinafter more fully described, and such engagement is maintained throughout the forward operation of the master controller. However, upon a predetermined backward movement of the controller from any operative position, the annular band 6 moves with the master controller for a distance corresponding to two notches, when the projection 7 of the band 6 strikes the pin 9 to prevent further movement of the slip-segment and to break the engagement of the contact member 5 with the corresponding control fingers.

Assuming that it is desired to effect acceleration of the motors from the 5000-volt trolley, the operation of the system may be set forth as follows: Upon movement of the master controller to its initial operative position $a$, a circuit is first established from the positive terminal B+ of the battery, through conductor 10, control fingers 10$a$ and 10$b$, which are bridged by contact segment 11, conductor 12, which is connected to a control finger 13 that is employed on other circuits to be described, conductor 14, train-line conductor 15 and conductor 16 to a common positively-energized conductor 17, whence one circuit is continued through conductor 18, coöperating contact members 19 of the overload trip OT in its lower position, conductor 20, interlock R2—out, conductor 21 and a plurality of parallel-connected circuits, respectively comprising actuating coils of the switches LS1, LS2 and LS3 and the actuating coil of the switch M1, together with a contact member 21$a$—CO—All in, whence circuit is completed through a common conductor 22, contact member 23 of the main-circuit reversing switch RS in its forward position, conductor 24, train-line conductor 25, conductor 26, contact segment 26 of the master reversing switch MR in its forward position, conductor 28, control fingers 29 and 30, which are bridged by the contact member 5 of the slip-segment, and conductors 32 and 33 to the negative terminal B— of the battery.

Upon the closure of the switch LS1, a holding interlock LS1—in bridges the above-mentioned interlock R2—out, thereby maintaining the supply-circuit-connecting switches closed during the remaining forward operation of the master controller.

A further circuit is established, at this time, from contact segment 34 of the master controller which engages the control finger 13, through control finger 35, conductor 36, train-line conductor 37, conductor 38, the actuating coil of the switch R1 and conductors 39, 40 and 41, train-line conductors 42, and conductor 43 to the negative conductor 33.

Still another circuit is established, in the first position of the master controller, from the positively energized conductor 10, through conductor 46, train-line conductor 47, conductor 48, contact member 49—CC$h$—5000 v., contact member 50—CO—All in, interlocks P1—out and P2—out, the actuating coil of the switch S2, conductor 51 and interlock LS1—in, to the negative conductor 40. At this time, the several motors are connected in series-circuit relation but the circuit is open at the high-voltage switch S1. As soon as the low-voltage switch S2 is closed, so that no voltage of a relatively high value can be impressed across its terminals, a circuit is completed from the above-mentioned interlock P2—out, through conductor 52, interlock S2—in, the actuating coil of the switch S1, conductors 53 and 54, auxiliary contact members 55 of the overload trip OT, and conductor 56 to the negatively-energized conductor 22. The motors are connected in series-circuit relation across the high-voltage supply circuit, as illustrated in Fig. 8 of the drawings.

The switch B of the auxiliary circuits AC is also closed by the completion of a circuit from interlock 50—CO—All in, through conductor 57, the actuating coil of the switch B, interlock LS2—in and conductor 58, which is connected to the negative conductor 40.

To effect further acceleration of the motors, the master controller may be moved to its second position $b$, whereupon the contact segment 34 engages control finger 59, whence circuit is completed through conductor 60, train-line conductor 61, conductor 62, contact member 63—CC$h$—5000 v., the actuating coil of the switch R2 and conductor 64 to the negative conductor 40, thereby short-circuiting a predetermined portion of the accelerating resistor AR.

In position $c$, a circuit is established from the contact segment 34 of the master controller, through control finger 65, conductor 66, train-line conductor 67, conductor 68, the actuating coil of the switch R3, and the conductor 69 to the negative conductor 40. The switch R1 is opened by reason of the disengagement of control finger 35 and contact segment 34.

In position $d$, control finger 70 engages contact segment 34, whence circuit is completed through conductor 71, train-line conductor 72, conductor 73, the actuating coil of the switch R4 and conductor 74 to the negative conductor 40.

Upon actuation of the master controller to its position $e$, the contact segment 34 engages control finger 75, from which point circuit is completed through conductor 76, train-line conductor 77, conductor 78, the actuating coil of the switch R5 and conductor 79 to the negative conductor 40. The switch R4 is open at substantially the same time.

In position $f$, the switches R1 and R4 are again closed, whereby the entire accelerating resistor AR is short-circuited and the motors are connected in full-series relation.

To effect "shunting" transition of the pairs of motors, the master controller is actuated toward its initial parallel position $g$, whereupon the resistor-short-circuiting switches R1, R4 and R5 are first opened, and the switch P2 is closed by reason of the completion of a circuit from contact segment 34 through control finger 80, conductor 81, train-line conductor 82, conductors 83, 84, 85 and 86, contact member 87—CO—All in, the actuating coil of the switch P2, and conductor 88 to conductor 54, which is connected to the negative battery terminals, as already traced.

Inasmuch as the switches S1, S2 and P2 are thus simultaneously closed, the pairs of armatures A2a and A2b and A4a and A4b are connected in a temporary closed circuit. Upon the closure of the switch P2, however, the switches S1 and S2 are quickly opened by reason of the exclusion from their governing circuit of the interlock P2—out.

A control circuit is next established from the conductor 84, through conductor 89, contact member 90—CO—All in, conductors 91 and 92, interlock S2—out, the actuating coil of the switch G, conductor 93, and interlock LS2—in to the negative conductor 40.

The transition of the motors is thus completed, with the exception of the closure of the high-voltage switch P1, which is effected as soon as the low-voltage switch G is closed, by reason of the establishment of a circuit from conductor 91, through conductor 94, interlock G—in, the actuating coil of the switch P1, interlock S1—out and conductor 54, which is connected to the negative side of the battery circuit.

It should be noted that, in the case just recited, the low-voltage switch G is connected in series relation with the high-voltage switches P1, LS1, LS2, and LS3, but the switch G is closed before the switch P1 can possibly close, thus preventing the impression of an unsuitably high voltage across the terminals of the low-voltage switch G.

Upon the closure of the switch P1, the conductors 16 and 84 are connected by a circuit comprising conductor 95, interlock P1—in and conductor 96. However, the completion of this circuit effects no changes in the control system at the present time but is employed to prevent the low-voltage switch G from opening the high-voltage circuit when the conductor 83 is deënergized upon backward movement of the master controller from position g. Thus, the switch G cannot open until the high-voltage switch LS2 has opened, as hereinafter fully explained. The circuits formed through the motors during the transition from position f to position g and in position g are respectively illustrated in Figs. 9 and 10 of the drawings.

To effect further acceleration of the parallel-connected pairs of motors, the master controller may be moved successively through its positions h to k, inclusive, whereupon the switch R4 is closed, the switch R5 is closed and the switch R4 is opened, the switch R1 is closed, and the switch R4 is closed, by the engagement of the contact segment 34 of the master controller with the corresponding control fingers, whereby the accelerating resistor AR is suitably excluded from circuit, and the pairs of motors are finally disposed in full-parallel relation.

Assuming that the master controller is actuated backwardly from its final operative position k, the governing circuits of the switches R4 and R1 are open, thus disposing a certain portion of the resistor AR in circuit. When the master controller has been moved back beyond its position i, however, contact segment 5 becomes disengaged from the control fingers 29 and 30 by reason of the mechanical engagement of the projection 7 of the annular band 6 and the pin 9, as hereinbefore explained, and, consequently, the actuating circuits of the line switches LS1, LS2 and LS3, as well as the actuating circuits of the other high-voltage switches, are interrupted. In this way, prior to the opening of the motor circuit by the line switches, a certain amount of resistance is included in circuit with the motors for reducing the amount of current flowing through the circuit that is broken by the line switches, as is fully set forth in a copending application of K. A. Simmon, Serial No. 54,340, filed October 6, 1915, patented Nov. 12, 1918, No. 1,284,798, and assigned to the Westinghouse Electric and Manufacturing Company, to which reference may be made for any further description. However, it should be observed that, by reason of the inclusion of the interlocks LS1—in and LS2—in in the energizing circuits of the actuating coils of the switches S2 and G, respectively, these low-voltage switches are prevented from opening until after the high-voltage line switches have opened.

Assuming that the electric railway vehicle is running through a city or other thickly populated district where the use of a relatively low operating voltage is necessary, so that the motor-control system is energized from the low-voltage trolley, 600 v. T, the control change-over switch CCh is first actuated to its position marked 600 v., and the motor change-over switches SW1 to SW4 are moved to the dotted line positions, whereupon the master controller MC may be actuated to its initial operative position a and the following circuits are established: switches LS1, LS2, LS3 and M1 are closed by the completion of a circuit from conductor 20, through interlock 1—out, contact member 31—CCh—600 v., conductor 21, and thence, as already traced in connection with 5000-volt operation, the switch R1 is closed, as hereinbefore set forth; and, in addition, a circuit is completed from the positive supply-circuit conductor 17, through conductor 97, contact member 98—CCh—600—v., the actuating coil of the switch R4 and conductor 74 to the negative conductor 40.

Another circuit is simultaneously established from contact member 98, through conductor 99, contact member 100—CCh—600—v., the actuating coil of switch R2 and conductor 64 to the negative conductor 40.

Another circuit is completed from the positive conductor 16, through conductor 101, contact member 102—CCh—600 v., conductors 103 and 85, and thence through the actuating coil of the switch P2, as previously described. The actuating coils of the switches G and P1 are also energized in that order from the conductor 89, which is connected to conductor 103, in accordance with the circuits already traced in connection with 5000-volt operation.

Figure 11:
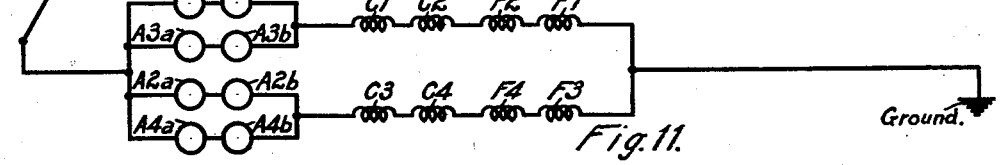

Inasmuch as the switches R1, R2 and R4 are all closed, the accelerating resistor AR is completely short-circuited, and the closure of the switches P1, P2 and G disposes the pairs of motors in parallel relation. Thus, the initial circuit connection of the motors to the 600-volt supply circuit corresponds to full-parallel relation of the motor armatures, as illustrated in Fig. 11 of the drawings.

Figure 12:
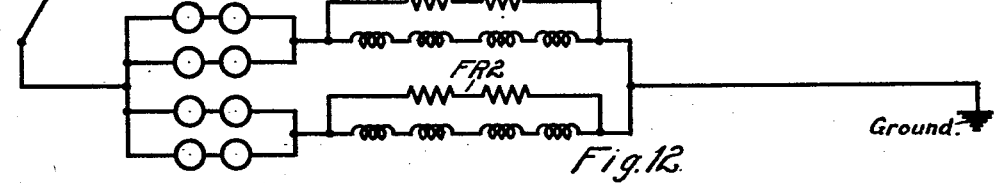

If the master controller is moved to its position b, a circuit is established from conductor 62, which is connected to control finger 59, through contact member 104—CCh—600 v. and the parallel-connected actuating coils of the switches 1 and 2 to the negative conductor 40. The circuits formed through the motors are illustrated in Fig. 12 of the drawings.

Figure 13:
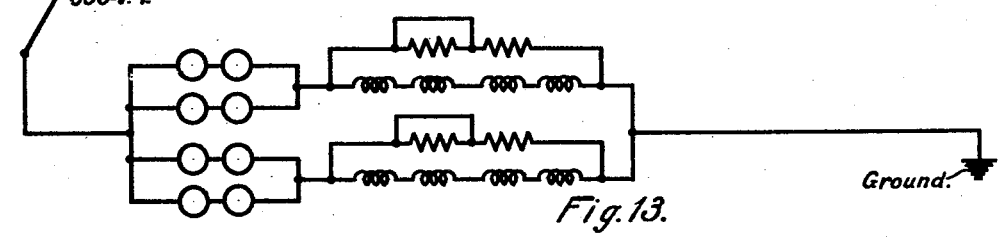

In position c, which is the final position that is employed during 600-volt operation, a circuit is established from conductor 68, which is connected to control finger 65, through contact member 105—CCh—600 v. and the parallel-connected actuating coils of the switches 3 and 4 to the negative conductor 40. The circuits through the motors in position c are illustrated in Fig. 13 of the drawings.

It will be observed that further acceleration of the motors after connection to the 600-volt trolley is accomplished by the use of a field-control scheme. The closure of the switches 1 and 2 serves to connect the resistors RF1 and FR2 in parallel relation to the circuits comprising the field windings C1, C2, F1 and F2, and C3, C4, F3 and F4, respectively, the resistance value of the resistors FR1 and FR2 being selected to effect the impression of the voltage upon the field-winding circuits that is lower, by a predetermined amount, than the voltage originally impressed upon the field-winding circuits.

The subsequent closure of the switches 3 and 4 serves to short-circuit portions of the resistors FR1 and FR2, respectively, whereby the voltage of each field-winding circuit is correspondingly and materially reduced, and a further increase of operating speed is effected, in accordance with familiar principles.

When the motors are connected across a low-voltage supply circuit, the commutating field windings C1 to C4, inclusive, as well as the field windings, F1 to F4, inclusive, are shunted by the resistors FR1 and FR2, inclusive, in order to simplify the connections. It is inadvisable to shunt the commutating field windings when the motors are connected across a high-voltage supply circuit, but, when the motors are connected across a low-voltage supply circuit, the operation thereof is very satisfactory.

I do not wish to be restricted to the specific circuit connections and arrangement and location of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a plurality of motors having armatures and main and auxiliary field-magnet windings, of means for connecting said motors in pairs across the supply circuit, the armatures of each pair of motors being disposed in parallel-circuit relation and the main and the auxiliary field windings being disposed in series-circuit relation, and means for simultaneously varying the excitation of the main and the auxiliary field windings to accelerate the motors.

2. In a system of control, the combination with a supply circuit, and a plurality of motors having twin-armatures and main and auxiliary field-magnet windings, of means for connecting said motors across the supply circuit, the twin-armatures being disposed in parallel-circuit relation and the main and auxiliary field windings being disposed in series-circuit relation, and means for simultaneously varying the excitation of said main and auxiliary field windings to accelerate the motors.

3. In a system of control, the combination with a high and a low voltage supply circuit and a plurality of pairs of motors having armatures and field-magnet windings, of means for connecting said motors across the supply circuits, the armatures of each pair of motors being disposed in parallel-circuit relation and the field windings being disposed in series-circuit relation, and an adjustable resistor shunted around the field windings of each pair of motors for varying the excitation of said field windings to accelerate the motors when the same are connected across the low voltage supply circuit.

4. In a system of control, the combination with supply circuits of a high and a relatively low voltage, and a plurality of motors adapted to be connected to said supply circuits and having armatures and main and auxiliary field-magnet windings, of means for connecting said motors in series and in series-parallel circuit relation across the high-voltage supply circuit, and means for connecting said motors in pairs across the low-voltage supply circuit, the armatures of each pair of motors being disposed in parallel-circuit relation and the field windings being disposed in series-circuit relation when the motors are connected across the low-voltage supply circuit.

5. In a system of control, the combination with supply circuits of a high and a relatively low voltage, and a plurality of motors having armatures and field-magnet windings and adapted to be connected across said supply circuits, of means for connecting the motors in series and in series-parallel circuit relation across the high-voltage supply circuit and for connecting the motors across the low-voltage supply circuit, with the armatures disposed in parallel-circuit relation, and means for varying the excitation of the field windings to accelerate the motors when the same are connected across the low-voltage supply circuit.

6. In a system of control, the combination with supply circuits of a high and a relatively low voltage and a plurality of motors having armatures and field-magnet windings and adapted to be connected across said supply circuits, of means for connecting said motors in series and in series-parallel-circuit relation across the high-voltage supply circuit and for connecting the motors in pairs across the low-voltage supply circuit, with the armatures of each pair of motors disposed in parallel-circuit relation and the field windings in series-circuit relation thereto, and a variable resistor shunted around the field windings of each pair of motors for accelerating the same when they are connected across the low-voltage supply circuit.

7. In a system of control, the combination with supply circuits of a high and a relatively low voltage, and a plurality of motors having twin armatures and main and auxiliary field-magnet windings and adapted to be connected across said supply circuits, of means for connecting said motors in series and in series-parallel-circuit relation across the high-voltage supply circuit and for connecting the motors in pairs across the low-voltage supply circuit, with the twin armatures of each pair of motors disposed in parallel-circuit relation and the main and the auxiliary field windings disposed in series-circuit relation thereto, and a variable resistor shunted around the field windings of each pair of motors for accelerating the same when they are connected across the low-voltage supply circuit.

8. In a system of control, the combination with a supply circuit, and a plurality of motors having twin armatures and main and auxiliary field-magnet windings, of means for connecting said motors across said supply circuit, the twin armatures being disposed in parallel-circuit relation and the main and auxiliary field windings being disposed in series-circuit relation thereto, and a variable resistor connected in shunt to said main and said auxiliary field windings for varying the excitation of the field windings to accelerate the motors.

9. In a system of control, the combination with supply circuits of a high and a relatively low voltage, and a plurality of motors having armatures and field-magnet windings and adapted to be connected across said supply circuits, of means for connecting said motors in series and in series-parallel-circuit relation across the high-voltage supply circuit and for connecting the motors in pairs across the low-voltage supply circuit, with the armatures of each pair of motors disposed in parallel-circuit relation and the field windings disposed in series-circuit relation, and means for varying the excitation of the field windings to accelerate the motors when the latter are connected across the low-voltage supply circuit.

In testimony whereof, I have hereunto subscribed my name this 29th day of August, 1916.

NORMAN W. STORER.